United States Patent
Do

(10) Patent No.: US 10,604,977 B2
(45) Date of Patent: Mar. 31, 2020

(54) PRESSURE RELIEF LATCH

(71) Applicant: Arconic Inc., Pittsburgh, PA (US)

(72) Inventor: Thai Do, Laguna Niguel, CA (US)

(73) Assignee: Arconic Inc., Pittsburgh, PA (US)

( * ) Notice: Subject to any disclaimer, the term of this patent is extended or adjusted under 35 U.S.C. 154(b) by 862 days.

(21) Appl. No.: 15/224,026

(22) Filed: Jul. 29, 2016

(65) Prior Publication Data

US 2017/0037667 A1    Feb. 9, 2017

Related U.S. Application Data

(60) Provisional application No. 62/200,971, filed on Aug. 4, 2015.

(51) Int. Cl.
  *E05C 19/02* (2006.01)
  *B64D 29/06* (2006.01)
  (Continued)

(52) U.S. Cl.
  CPC .............. *E05C 19/02* (2013.01); *B64D 29/06* (2013.01); *E05B 15/04* (2013.01); *E05B 51/023* (2013.01);
  (Continued)

(58) Field of Classification Search
  CPC ... Y10T 292/216; Y10S 292/31; Y10S 292/49
  See application file for complete search history.

(56) References Cited

U.S. PATENT DOCUMENTS

| | | | |
|---|---|---|---|
| 1,206,342 A | | 11/1916 | Linborg |
| 2,337,531 A | * | 12/1943 | Stockton ................ E05C 3/122 |
| | | | 292/229 |

(Continued)

FOREIGN PATENT DOCUMENTS

| | | |
|---|---|---|
| CA | 2826868 A1 | 7/2012 |
| CN | 102191876 A | 9/2011 |

(Continued)

OTHER PUBLICATIONS

International Search Report and Written Opinion dated Oct. 28, 2016, issued by the European Patent Office in International Patent Application No. POCT/US2016/044811 filed Jul. 29, 2016 (13 pages).

(Continued)

*Primary Examiner* — Carlos Lugo
(74) *Attorney, Agent, or Firm* — Greenberg Traurig, LLP

(57) ABSTRACT

A latch including a housing having side members each having an elongated slot, a bolt mounted rotatably to the housing and positioned between the side members of the housing, a trigger mounted rotatably to the housing, and a pin and roller positioned slidably within the elongated slots of the side members of the housing. The bolt is moveable between a first, closed position and a second open position. The trigger is moveable between a first position, in which the pin and roller are engaged with the bolt when the bolt is in its first position, and a second position, in which the pin and roller are disengaged from the bolt. The latch can be opened automatically when a defined load is provided on the bolt, or manually by depressing the trigger to disengage the pin and roller from the bolt.

11 Claims, 4 Drawing Sheets

(51) Int. Cl.
*E05B 15/04* (2006.01)
*E05B 51/02* (2006.01)
*E05C 3/24* (2006.01)

(52) U.S. Cl.
CPC ......... *E05B 2015/0448* (2013.01); *E05C 3/24* (2013.01); *Y10S 292/31* (2013.01); *Y10S 292/49* (2013.01); *Y10T 292/216* (2015.04)

(56) References Cited

U.S. PATENT DOCUMENTS

| | | | |
|---|---|---|---|
| 2,639,178 A * | 5/1953 | Hogan | E05C 3/122 292/229 |
| 2,712,955 A | 7/1955 | Andrews | |
| 2,722,445 A * | 11/1955 | Cudney | E05C 3/122 292/229 |
| 2,726,889 A | 12/1955 | Lawson | |
| 2,904,141 A | 9/1959 | Henrichs | |
| 2,927,812 A | 3/1960 | Smith et al. | |
| 2,944,848 A | 7/1960 | Mandolf | |
| 3,047,321 A * | 7/1962 | Gander | E05C 3/122 292/196 |
| 3,070,395 A | 12/1962 | Morrison et al. | |
| 3,259,411 A | 7/1966 | Griffiths | |
| 3,259,412 A | 7/1966 | Wheeler | |
| 3,341,239 A | 9/1967 | Wheeler | |
| 3,347,578 A | 10/1967 | Sheehan et al. | |
| 3,473,693 A | 10/1969 | Fritz | |
| 3,917,327 A | 11/1975 | Plasko | |
| 4,053,177 A | 10/1977 | Stammreich et al. | |
| 4,099,751 A | 7/1978 | Poe et al. | |
| 4,116,479 A | 9/1978 | Poe | |
| 4,130,307 A | 12/1978 | Poe et al. | |
| 4,183,564 A | 1/1980 | Poe | |
| 4,220,364 A | 9/1980 | Poe | |
| 4,307,905 A * | 12/1981 | Poe | E05B 65/006 292/200 |
| 4,365,831 A * | 12/1982 | Bourne | E05C 3/122 292/210 |
| RE31,935 E | 7/1985 | Poe | |
| 4,530,529 A | 7/1985 | Poe et al. | |
| 4,538,843 A | 9/1985 | Harris | |
| 4,602,812 A | 7/1986 | Bourne | |
| 4,641,868 A | 2/1987 | Miron | |
| 4,826,221 A | 5/1989 | Harmon | |
| 4,828,299 A | 5/1989 | Poe | |
| 4,858,970 A | 8/1989 | Tedesco et al. | |
| 4,911,488 A | 3/1990 | Brackmann et al. | |
| 4,925,221 A * | 5/1990 | Carmody | E05C 3/08 292/196 |
| 5,152,926 A | 10/1992 | Brown | |
| 5,228,730 A | 7/1993 | Gokcebay et al. | |
| 5,341,752 A | 8/1994 | Hambleton | |
| 5,609,373 A | 3/1997 | Gromotka | |
| 5,620,212 A | 4/1997 | Bourne et al. | |
| 5,660,295 A | 8/1997 | Hroma et al. | |
| 5,664,813 A | 9/1997 | Gromotka | |
| 5,765,883 A | 6/1998 | Dessenberger et al. | |
| 5,984,382 A | 11/1999 | Bourne et al. | |
| 6,123,370 A | 9/2000 | Rozema et al. | |
| 6,343,815 B1 | 2/2002 | Poe | |
| 6,361,090 B1 | 3/2002 | Fan | |
| 6,513,841 B1 | 2/2003 | Jackson | |
| 6,755,448 B2 | 6/2004 | Jackson et al. | |
| 6,913,297 B2 | 7/2005 | Jackson et al. | |
| 7,029,038 B2 | 4/2006 | Kobrehel | |
| 7,156,429 B2 | 1/2007 | Eriksson | |
| 7,504,601 B2 | 3/2009 | Belmond et al. | |
| 7,857,362 B2 | 12/2010 | Deblock | |
| 8,479,543 B2 | 7/2013 | Yang et al. | |
| 8,646,819 B2 | 2/2014 | Do et al. | |
| 8,727,390 B2 | 5/2014 | Do | |
| 8,864,185 B2 | 10/2014 | Do | |
| 9,353,559 B2 | 5/2016 | Fabre et al. | |
| 2002/0000726 A1 | 1/2002 | Zintler | |
| 2002/0060459 A1 | 5/2002 | Zintler | |
| 2005/0087996 A1 | 4/2005 | Jackson et al. | |
| 2006/0214431 A1 | 9/2006 | Helsley et al. | |
| 2008/0129056 A1 | 6/2008 | Hernandez et al. | |
| 2011/0109103 A1 | 5/2011 | Huston et al. | |
| 2012/0102842 A1 | 5/2012 | Fournie et al. | |
| 2012/0151724 A1 | 6/2012 | DeFrance et al. | |
| 2012/0242096 A1 | 9/2012 | Rozema | |
| 2012/0242097 A1 | 9/2012 | Hernandez | |
| 2013/0043350 A1 | 2/2013 | DeFrance et al. | |
| 2014/0035296 A1 * | 2/2014 | Jackson | B64D 29/06 292/194 |
| 2015/0184543 A1 | 7/2015 | Fabre et al. | |
| 2015/0184544 A1 | 7/2015 | Fabre et al. | |
| 2015/0232189 A1 * | 8/2015 | Hernandez | B64D 29/06 292/200 |
| 2017/0058582 A1 * | 3/2017 | Do | E05B 63/0056 |

FOREIGN PATENT DOCUMENTS

| | | |
|---|---|---|
| CN | 205976826 U | 2/2017 |
| DE | 202220 C | 9/1908 |
| DE | 29807738 U1 | 7/1998 |
| EP | 1091059 A2 | 4/2001 |
| EP | 2031157 A1 | 3/2009 |
| FR | 2397503 A1 | 2/1979 |
| FR | 2852049 A1 | 9/2004 |
| GB | 191493 A | 1/1923 |
| GB | 1497982 A | 1/1978 |
| GB | 1537410 A | 12/1978 |
| WO | 2010033026 A1 | 3/2010 |
| WO | 2010149905 A1 | 12/2010 |
| WO | 2011/069103 A1 | 6/2011 |

OTHER PUBLICATIONS

Aerospace Latching Systems, Alcoa Fastening Systems, http://www.alcoa.com/fastening_systems/aerospace/en/product.asp?cat_id=213&prod_id=500,pp. 11-2, 159-60, and i-iii (8 pages).
Fairchild Fasteners, Aerospace Mechanisms, "RAM™ Aerospace Latch Mechanism", 2000 (4 pages).
Rotary Latch #TL18261, Alcoa Fastening Systems, Mar. 2005 (1 page).
English-language translation of WO 2010/149905 A1 (8 pages).
International Search Report and Written Opinion dated Jul. 20, 2012, issued by the European Patent Office in connection with International Patent Application No. PCT/US2012/028418 entitled "Pin Latch Having Intermediate Position" (13 pages).
International Search Report and Written Opinion dated Jan. 18, 2013, issued by the European Patent Office in connection with International Patent Application No. PCT/US2012/059206 entitled "Rotary-Handle Latch" (9 pages).
International Search Report and Written Opinion dated Feb. 25, 2013, issued by the European Patent Office in connection with International Patent Application No. PCT/US2012/066039 entitled "Pin Latch With Detection Device and Movable Catch-Pin and Intermediate Position With Automatic Return Mechanism" (15 pages).
International Search Report and Written Opinion dated Dec. 29, 2011, issued by the European Patent Office in connection with International Patent Application No. PCT/US2011/027871 entitled "Latch With Adjustable Handle" (17 pages).
International Search Report and Written Opinion dated Jul. 15, 2011, issued by the European Patent Office in connection with International Patent Application No. PCT/US2011/027671 entitled "Latch With Adjustable Handle" (8 pages).
International Search Report and Written Opinion dated Jun. 7, 2011, issued by the European Patent Office in connection with International Patent Application No. PCT/US2011/024031 entitled "Side-Driven Action Pin Latch" (9 pages).
International Search Report and Written Opinion dated Jun. 9, 2016, issued by the European Patent Office in connection with International Patent Application No. PCT/US2016/024836 (13 pages).

(56) References Cited

OTHER PUBLICATIONS

Alcoa Fastening Systems, Document TL18356 Rev. D, dated Jul. 7, 2015 (2 pages).
Alcoa Fastening Systems, Document TL22028 Rev. P, dated Jun. 18, 2015 (2 pages).

* cited by examiner

PRESSURE RELIEF LATCH

CROSS-REFERENCE TO RELATED APPLICATION

This application is a Section 111(a) application relating to and claiming the benefit of commonly-owned, U.S. Provisional Patent Application Ser. No. 62/200,971, filed Aug. 4, 2015, entitled "PRESSURE RELIEF LATCH," the content of which is incorporated herein by reference in its entirety.

FIELD OF THE INVENTION

The present invention relates to latches and, more particularly, pressure relief latches.

BACKGROUND OF THE INVENTION

Removable and moveable elements installed on exterior surfaces of aerospace vehicles, such as hatches, doors, access panels, engine cowlings, nacelles, and radomes employ latches. What is desirable is a latch that can be opened or closed manually or it can be opened automatically when a defined load is reached.

SUMMARY OF THE INVENTION

In an embodiment, a latch includes a housing having a first end, a second end opposite the first end, first and second side members, each of which includes an outer surface, an inner surface, and an elongated slot extending from the outer surface to the inner surface and between the first and second ends, the first and second side members forming a space between the inner surfaces thereof, a base portion positioned at the second end and including first and second coves, each of which is positioned adjacent to an outer surface of a corresponding one of the first and second side members, the base portion including a first slot located intermediate the first and second coves and extending to the space, and a mounting portion positioned at the first end and including a second slot extending to the space; a bolt mounted rotatably to the housing proximate to the first end thereof and positioned between the first and second side members of the housing, the bolt including a curvilinear portion, a first end located on the curvilinear portion, a linear portion, and a second end located on the linear portion, the bolt being moveable rotatably between a first position, in which the linear portion of the bolt extends through the space and the second end of the bolt extends through and protrudes from the second slot of the mounting portion of the housing, and a second position, in which the curvilinear portion of the bolt extends through and protrudes from the second slot and the linear portion is positioned external of the second slot; a trigger mounted rotatably to the housing, the trigger including a first end protruding from the first slot of the base portion of the housing, a second end, and a trigger slot formed within the second end of the trigger; first and second compression springs, one of which is positioned within the first cove of the housing and the other of which is positioned within the second cove of the housing, each of the first and second compression springs including an end cap; and a pin and roller extending through the end caps of the first and second compression springs and the trigger slot of the trigger, the pin and roller being positioned slidably within the elongated slots of the first and second side members of the housing, wherein the trigger is moveable between a first position, in which the pin and roller is engaged with the bolt when the bolt is in its first position, and a second position, in which the pin and roller is disengaged from the bolt.

In an embodiment, the bolt includes a notch formed within the linear portion thereof and adjacent to one end of the curvilinear portion, and wherein the bolt notch is adapted to receive the pin and roller when the bolt is in its first position. In an embodiment, the bolt is mounted rotatably to the housing by a rivet. In an embodiment, the bolt includes a slot formed within the first end of the bolt and a torsion spring positioned on the rivet and within the slot of the bolt. In an embodiment, the trigger is mounted to the housing by a rivet. In an embodiment, the latch is adapted to be operated manually by providing a force on the first end of the trigger to rotate the trigger from its first position to its second position, thereby disengaging the pin and roller away from the bolt notch of the bolt. In an embodiment, the bolt is retained in its second position by the torsion spring. In an embodiment, the bolt is adapted to be rotated from its second position to its first position by providing pressure on the first end of the bolt and rotating the bolt to make contact with the pin and roller and pushing to pin and roller away until the pin and roller engages the notch of the bolt. In an embodiment, the bolt is adapted to be rotated from its first position to its second position when a defined load is provided on the first end of the bolt, such that the bolt pushes the pin and roller in the elongated slots of the side members of the housing and loaded by the compression springs. In an embodiment, the bolt is retained in its second position by the torsion spring. In an embodiment, the bolt is adapted to be rotated from its second position to its first position by providing pressure on the first end of the bolt and rotating the bolt to make contact with the pin and roller and pushing to pin and roller away until the pin and roller engages the notch of the bolt.

In another embodiment, a latch includes a housing having a first end, a second end opposite the first end, first and second side members, each of which includes an outer surface, an inner surface, and an elongated slot extending from the outer surface to the inner surface and between the first and second ends, the first and second side members forming a space between the inner surfaces thereof, a base portion positioned at the second end and including first and second coves, each of which is positioned adjacent to an outer surface of a corresponding one of the first and second side members, the base portion including a first slot located intermediate the first and second coves and extending to the space, and a mounting portion positioned at the first end and including a second slot extending to the space; a bolt mounted rotatably to the housing proximate to the first end thereof and positioned between the first and second side members of the housing, the bolt including a curvilinear portion, a first end located on the curvilinear portion, a linear portion, and a second end located on the linear portion, the bolt being moveable rotatably between a first position, in which the linear portion of the bolt extends through the space and the second end of the bolt extends through and protrudes from the second slot of the mounting portion of the housing, and a second position, in which the curvilinear portion of the bolt extends through and protrudes from the second slot and the linear portion is positioned external of the second slot; and a pin and roller positioned slidably within the elongated slots of the first and second side members of the housing.

DETAILED DESCRIPTION OF THE DRAWINGS

Figure 1:
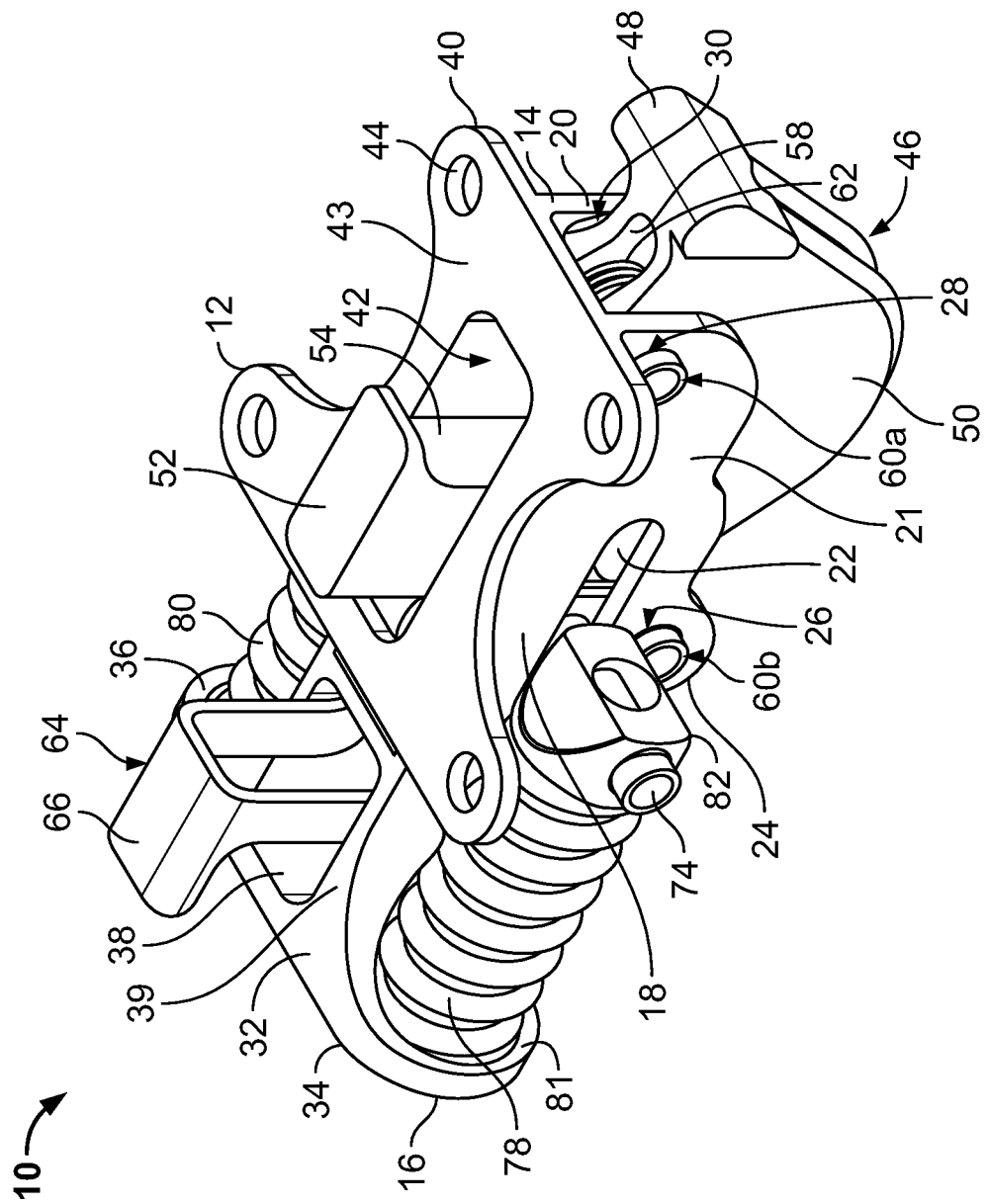
FIG. 1 is a top perspective view of an embodiment of a pressure relief latch shown in a closed position.
Figure 2:
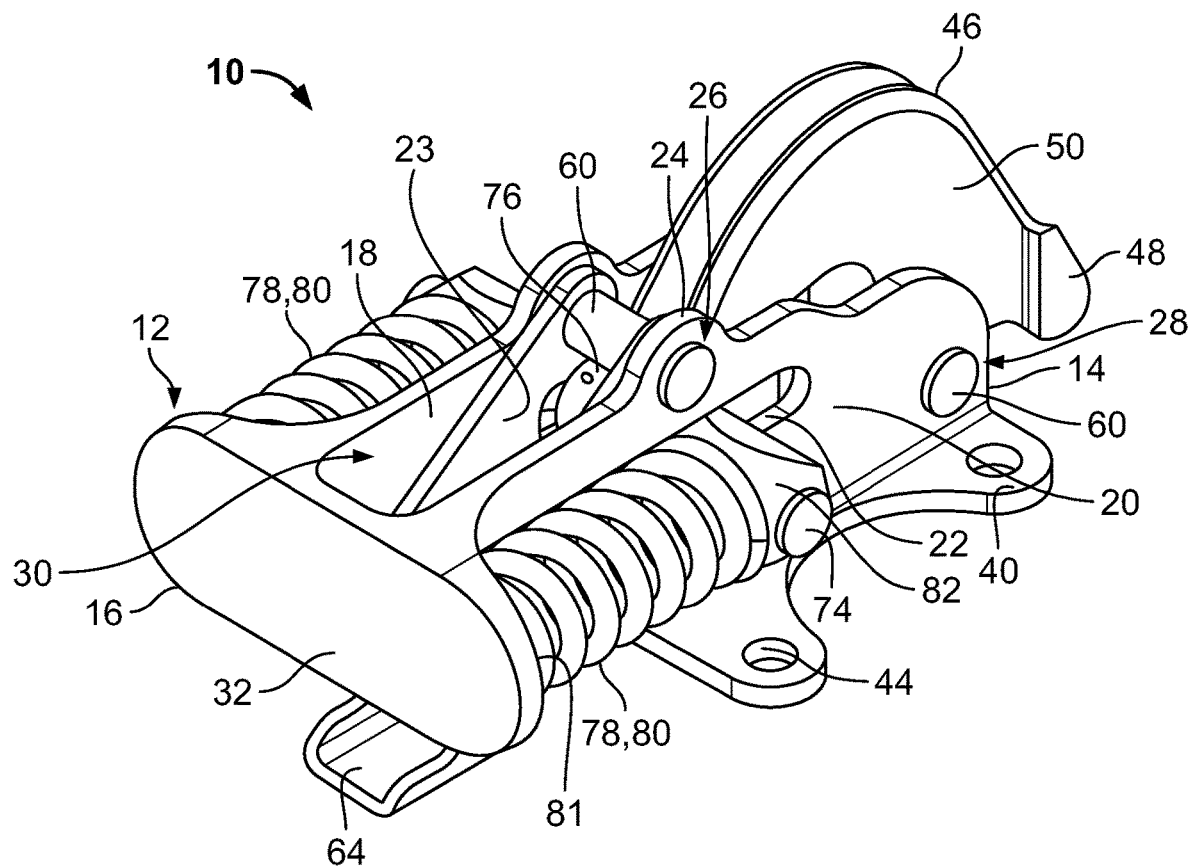
FIG. 2 is a bottom perspective view of the pressure relief latch shown in FIG. 1.
Figure 3:
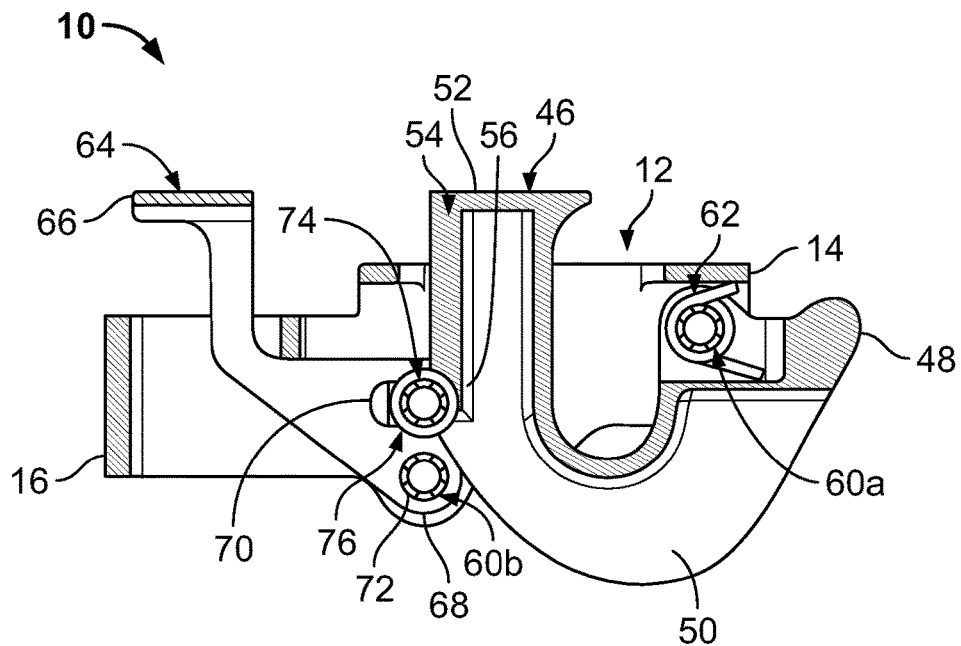
FIG. 3 is a side cross-sectional view of the pressure relief latch shown in FIG. 1.

Referring to FIGS. 1 through 3, in an embodiment, a pressure relief latch 10 includes a housing 12 having a first end 14 and a second end 16 opposite the first end 14. The housing 12 includes first and second side members 18, 20, each of which extends from the first end 14 to the second end 16 and includes an outer surface 21, an inner surface 23 opposite the outer surface 21, and an elongated slot 22 extending from the outer surface 21 to the inner surface 23 and intermediate the first and second ends 14, 16. Each of the side members 18, 20 further includes a tab 24 having a first hole 26 extending from the outer surface 21 to the inner surface 23 and a second hole 28 located proximate to the first end 14 and extending from the outer surface 21 to the inner surface 23. A space 30 is formed between the inner surfaces 23 of the first and second side members 18, 20. In an embodiment, the housing 12 further includes a base portion 32 formed at the second end 16 thereof. The base portion 32 includes first and second coves 34, 36 each of which is positioned adjacent to the outer surface 21 of a corresponding one of the first and second side members 18, 20. The base portion 32 further includes a slot 38 located intermediate the coves 34, 36 and extending from an upper surface 39 of the base portion 32 to the space 30. In an embodiment, the slot 38 is substantially rectangular in shape. The housing 12 further includes a mounting portion 40 having a slot 42 that extends from an upper surface 43 of the mounting portion 40 to the space 30, and a plurality of mounting holes 44. In an embodiment, the slot 42 is substantially rectangular in shape.

In an embodiment, the pressure relief latch 10 includes a bolt 46. In an embodiment, the bolt 46 is J-shaped. In other embodiments, the bolt 46 can have a U-shape or any other suitable shape. In an embodiment, the bolt 46 includes a first end 48 located on an arcuate/curvilinear portion 50 and a second end 52 located on a linear portion 54. In an embodiment, the bolt 46 includes a bolt notch 56 formed within the linear portion 54 and adjacent to one end of the curvilinear portion 50. A slot 58 is formed within the first end 48 of the bolt 46. In an embodiment, the bolt 46 is mounted rotatably to the housing 12 such that the first end 48 of the bolt 46 is mounted to the first end 14 of the housing 12 by a rivet 60a, which is inserted within the hole 28. In an embodiment, the linear portion 54 of the bolt 46 extends through the space 30 when the bolt 46 is in a first position, and the second end 52 of the bolt 46 extends through and protrudes from the slot 42 of the mounting portion 40 when the bolt 46 is in its first position. A torsion spring 62 is positioned on the rivet 60a and within the slot 58 of the bolt 46.

In an embodiment, the pressure relief latch 10 includes a trigger 64. In an embodiment, the trigger 64 is substantially "Z" in shape. In other embodiments, the trigger 64 includes other suitable shapes and sizes. In an embodiment, the trigger 64 includes a first end 66 and a second end 68. The second end 68 of the trigger 64 includes trigger slot 70 and a hole 72 (see FIG. 3). In an embodiment, the trigger 64 is mounted rotatably to the housing 12 such that the second end 68 of the trigger 64 is mounted to the holes 26 of the tabs 24 of the housing 12 by another rivet 60b extending through the hole 72, and a pin 74 having a roller 76 mounted thereon extending through the trigger slot 70 and the elongated slots 22 of the side members 18, 20. The first end 66 of the trigger 64 extends through and protrudes from the slot 38 of the base portion 32. In an embodiment, the pin 74 and the roller 76 combination are sized and shaped to engage the bolt notch 56 of the bolt 46 when the latch 10 is in its closed position.

In an embodiment, the pressure relief latch 10 includes first and second compression springs 78, 80 each of which is positioned within a corresponding one of the coves 34, 36 of the base portion 32 of the housing 12. One end of each of the springs 78, 80 is positioned against a rear interior portion 81 of a corresponding one of the coves 34, 36 of the base portion 32, while the other end of each of the springs 78, 80 includes a corresponding side cap 82 mounted thereon, which receives the pin 74 and the roller 76 combination.

Figure 4:
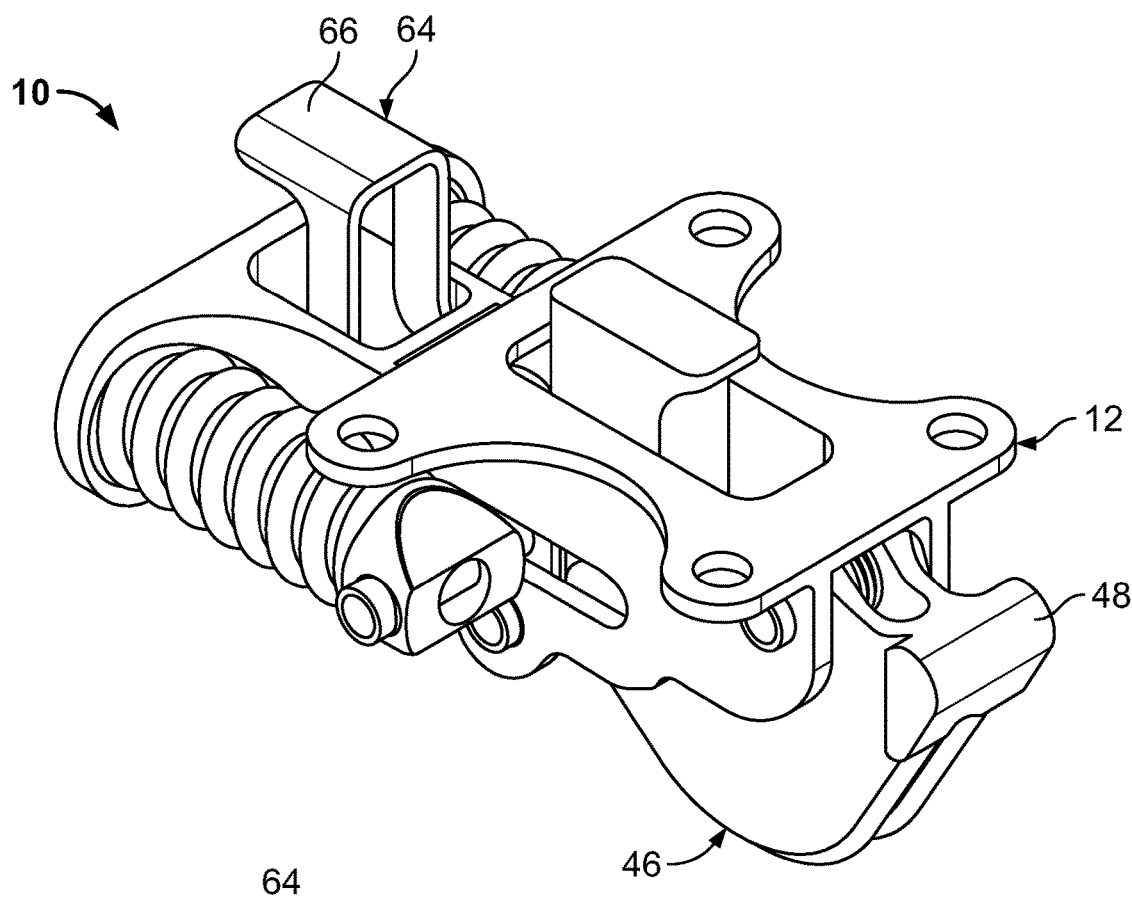
FIG. 4 is a top perspective view of the pressure relief latch shown in FIG. 1, showing areas for opening the latch from its closed position.

FIG. 4 shows the areas on the latch 10 where it can be opened. That is, the latch 10 can be opened manually by a human finger (or other implement) on the first end 66 of the trigger 64, or it can be opened automatically when a defined load is reached on the first end 48 on the bolt 46.

Figure 5:
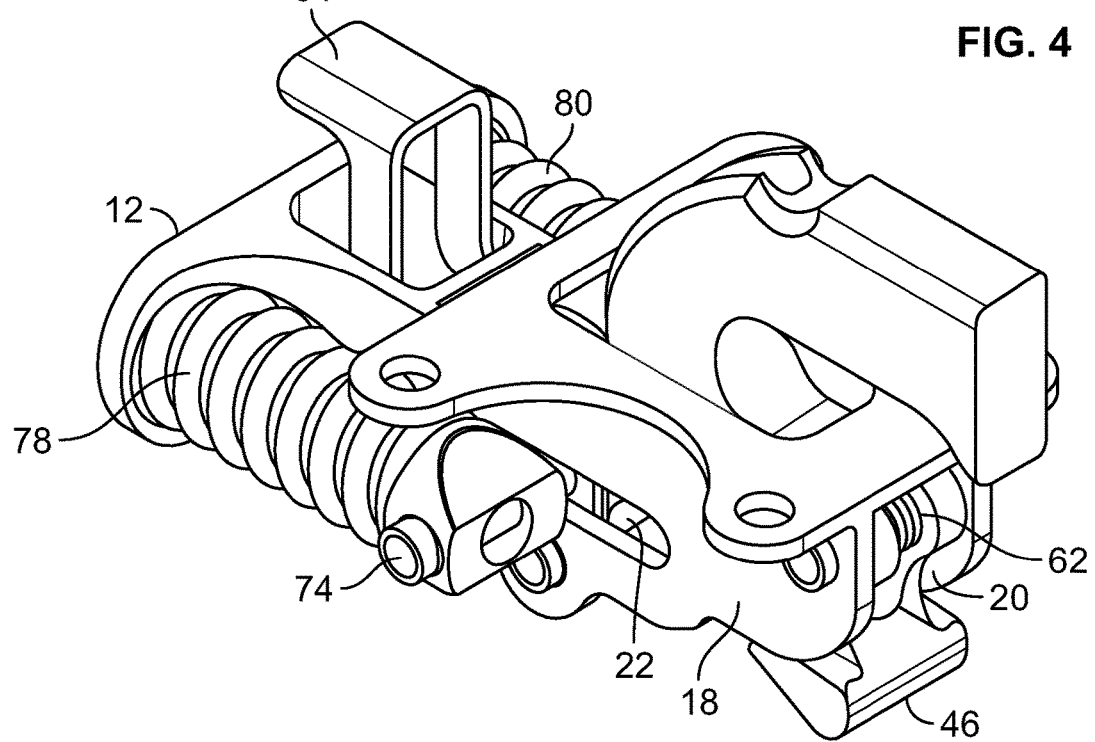
FIG. 5 is a top perspective view of the pressure relief latch shown in FIGS. 1 through 3, with the latch shown in an open position.
Figure 6:
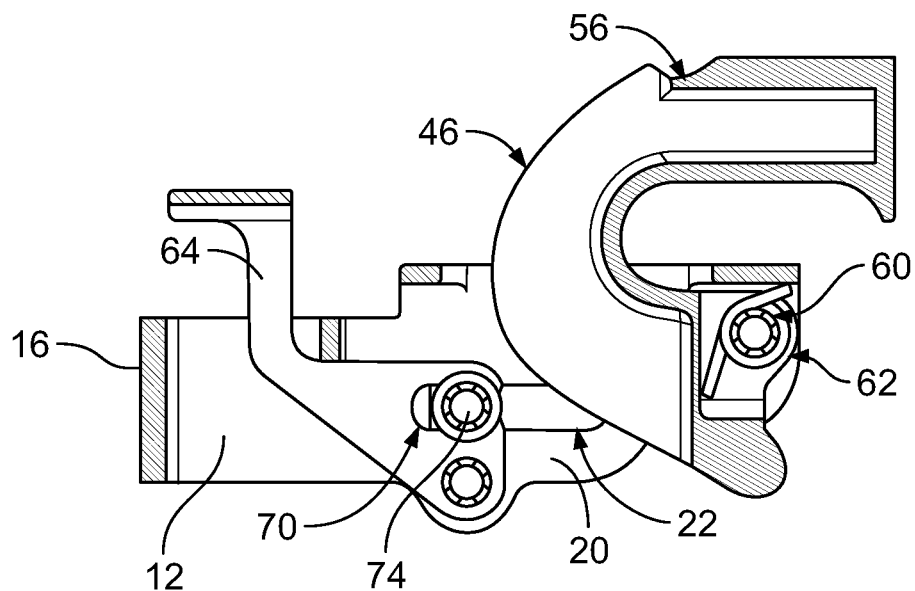
FIG. 6 is a side cross-sectional view of the pressure relief latch shown in FIG. 5.

Referring to FIGS. 5 and 6, in an embodiment, the latch 10 may be opened from its first, closed position to its second, open position under a defined load. As an example of a "defined load," when pressure builds up and reaches a defined pressure inside an engine compartment, the latch 10 pushes the engine compartment door open to release the pressure. When the defined load is reached, the bolt 46 rotates clockwise and pushes the roller 76, which is guided by the pin 74, in the elongated slots 22 of the side members 18, 20 of the housing 12 toward the second end 16 of the housing 12, and loaded by the compression springs 78, 80 away until the bolt 46 disengages the bolt notch 56 and stops. The bolt 46 is retained in its open position under the load of the torsion spring 62 acting thereon. In this regard, the trigger slot 70 allows the pin 74 and the roller 76 to move only in one direction, which is a direction away from the bolt 46 and toward the second end 16 of the housing 12.

Figure 7:
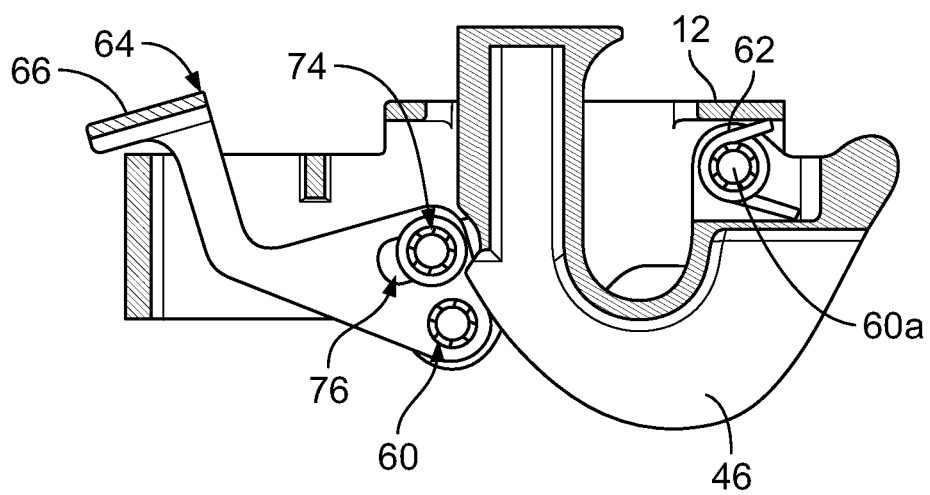
FIG. 7 is a side cross-sectional view of the pressure relief latch shown in FIG. 2, with a trigger employed by the latch shown in a depressed position.

Referring to FIG. 7, in an embodiment, the latch 10 may be opened from its first, closed position to its second, open position manually. From its closed position, the latch 10 can be opened by finger pressure on the first end 66 of the trigger 64, which pivots about the rivet 60b and rotates counterclockwise. In this regard, the trigger 64 pulls the pin 74 and roller 76 away from the bolt notch 56 of the bolt 46 until they disengage one another, thereby enabling the bolt 46 to automatically rotate clockwise under the load of the torsion spring 62 and is retained in open position.

In an embodiment, from its open position, the latch 10 can be closed manually by finger pressure on the second end 52 of the bolt 46, which pivots about the rivet 60a to rotate counterclockwise. In this regard, when the bolt 46 makes contact with the roller 76, the bolt 46 pushes the pin 74 and roller 76 away until the roller 76 engages the bolt notch 56 of the bolt 46. The bolt 46 is then retained in closed position.

It should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:

1. A latch, comprising:
   a housing having a first end, a second end opposite the first end, first and second side members, each of which includes an outer surface, an inner surface, and an elongated slot extending from the outer surface to the inner surface and between the first and second ends, the first and second side members forming a space between the inner surfaces thereof, a base portion positioned at the second end and including first and second coves, each of which is positioned adjacent to an outer surface of a corresponding one of the first and second side members, the base portion including a first slot located intermediate the first and second coves and extending to the space, and a mounting portion positioned at the first end and including a second slot and extending to the space;
   a bolt mounted rotatably to the housing proximate to the first end thereof and positioned between the first and second side members of the housing, the bolt including a curvilinear portion, a first end located on the curvilinear portion, a linear portion, and a second end located on the linear portion, the bolt being moveable rotatably between a first position, in which the linear portion of the bolt extends through the space and the second end of the bolt extends through and protrudes from the second slot of the mounting portion of the housing, and a second position, in which the curvilinear portion of the bolt extends through and protrudes from the second slot and the linear portion is positioned external of the second slot;
   a trigger mounted rotatably to the housing, the trigger including a first end protruding from the first slot of the base portion of the housing, a second end, and a trigger slot formed within the second end of the trigger;
   first and second compression springs, one of which is positioned within the first cove of the housing and the other of which is positioned within the second cove of the housing, each of the first and second compression springs including an end cap; and
   a pin and roller extending through the end caps of the first and second compression springs and the trigger slot of the trigger, the pin and roller being positioned slidably within the elongated slots of the first and second side members of the housing,
   wherein the latch is adapted to be operated manually by providing a force on the first end of the trigger to rotate the trigger between a first position, in which the pin and roller is engaged with the bolt when the bolt is in its first position, and a second position, in which the pin and roller is disengaged from the bolt.

2. The latch of claim 1, wherein the bolt includes a notch formed within the linear portion thereof and adjacent to one end of the curvilinear portion, and wherein the bolt notch is adapted to receive the pin and roller when the bolt is in its first position.

3. The latch of claim 2, wherein the bolt is mounted rotatably to the housing by a rivet.

4. The latch of claim 3, wherein the bolt includes a slot formed within the first end of the bolt and a torsion spring positioned on the rivet and within the slot of the bolt.

5. The latch of claim 4, wherein the trigger is mounted to the housing by a rivet.

6. The latch of claim 5, wherein the pin and roller are disengaged from the bolt notch of the bolt when the trigger is in its second position.

7. The latch of claim 6, wherein the bolt is retained in its second position by the torsion spring.

8. The latch of claim 7, wherein the bolt is adapted to be rotated from its second position to its first position by providing pressure on the first end of the bolt and rotating the bolt to make contact with the pin and roller and pushing to pin and roller away until the pin and roller engages the notch of the bolt.

9. The latch of claim 4, wherein the bolt is adapted to be rotated from its first position to its second position when a defined load is provided on the first end of the bolt, such that the bolt pushes the pin and roller in the elongated slots of the side members of the housing and loaded by the compression springs.

10. The latch of claim 9, wherein the bolt is retained in its second position by the torsion spring.

11. The latch of claim 10, wherein the bolt is adapted to be rotated from its second position to its first position by providing pressure on the first end of the bolt and rotating the bolt to make contact with the pin and roller and pushing to pin and roller away until the pin and roller engages the notch of the bolt.

* * * * *